(12) United States Patent
Ibarra et al.

(10) Patent No.: US 6,539,406 B1
(45) Date of Patent: *Mar. 25, 2003

(54) METHOD AND APPARATUS TO CREATE VIRTUAL BACK SPACE ON AN ELECTRONIC DOCUMENT PAGE, OR AN ELECTRONIC DOCUMENT ELEMENT CONTAINED THEREIN, AND TO ACCESS, MANIPULATE AND TRANSFER INFORMATION THEREON

(75) Inventors: Rodolfo Ibarra, Miami, FL (US); Fernando Valverde, Coral Gables, FL (US)

(73) Assignee: Conectron, Inc., Miami, FL (US)

( * ) Notice: Subject to any disclaimer, the term of this patent is extended or adjusted under 35 U.S.C. 154(b) by 131 days.

This patent is subject to a terminal disclaimer.

(21) Appl. No.: 09/620,429

(22) Filed: Jul. 20, 2000

Related U.S. Application Data

(63) Continuation-in-part of application No. 09/505,904, filed on Feb. 17, 2000, now abandoned.

(51) Int. Cl.⁷ ............................................... G06F 17/00
(52) U.S. Cl. ...................... 707/513; 345/760; 709/218
(58) Field of Search ................................ 707/500, 530, 707/513, 501.1, 511; 345/760, 781, 839; 704/258, 260; 709/232–235, 217–219

(56) References Cited

U.S. PATENT DOCUMENTS

| | | | | |
|---|---|---|---|---|
| 5,634,064 A | * | 5/1997 | Warnock et al. | ............ 345/784 |
| 5,890,172 A | * | 3/1999 | Borman et al. | ............. 345/781 |
| 5,894,554 A | | 4/1999 | Lowery et al. | ........ 395/200.33 |

(List continued on next page.)

OTHER PUBLICATIONS

King, Jim. The HTML Work Shop. http://members.tripod.com/jim_k_225/html_tutorials.htm. 1998. pp. 1–7.*

Spinway's Proven Full–Motion Video Patent–Pending Technology Brings Television Quality Commercials to Bluelight.com, Kmart's Online Presence Susan Hense, Director, Marketing Communications, Spinway, Inc.; May 31, 2000; p. 1–3 on Spinway.com webpage.

Spinway's Internet Advertising Network Reaches Over 2 Million Registered Consumers Susan Hense, Director, Marketing Communications, Spinway, Inc.; May 31, 2000; p. 1–2 on Spinway.com webpage.

Major Internet Advertisers Join Narrative to Announce Next–Generation Rich Media Advertising Solution Leigh Daily, Narrative Communications Corp. and Nancy Lyon, Spiralgroup; Oct. 27, 1998; p. 1–2 on @d:tech New York webpage.

Industry's Leading Ad Services and Ad Management Companies Announce Support For Narrative's Enliven 3.0 Leigh Daily, Narrative Communications Corp. and Nancy Lyon, Spiralgroup; Oct. 27, 1998; p. 1–3 on @d:tech New York webpage.

*Primary Examiner*—Joseph H. Feild
(74) *Attorney, Agent, or Firm*—Malin, Haley & DiMaggio, P.A.

(57) ABSTRACT

The present invention is a system and method for creating virtual space on the back of an electronic document page or element of an electronic document page and for managing, storing, delivering and displaying information on the back space of an electronic document page of element. The present invention provides a method and an apparatus for creating a "Web Back Space" to an original Web Page, adding new or annotating existing information to the newly created Web Back Space, paring the Web Back Space with the front side of the Web Page allowing the user to display this "Web Back Space" by the movement or click of a mouse, or after a predetermined amount of time. In this manner, information on the front and the back space of a Web page is permanently or temporarily "glued" together.

2 Claims, 2 Drawing Sheets

U.S. PATENT DOCUMENTS

| | | | |
|---|---|---|---|
| 5,907,681 A | 5/1999 | Bates et al. | 395/200.58 |
| 5,918,239 A | 6/1999 | Allen et al. | 707/526 |
| 5,924,104 A * | 7/1999 | Earl | 707/501.1 |
| 5,929,849 A | 7/1999 | Kikinis | 345/327 |
| 5,931,904 A | 8/1999 | Banga et al. | 709/217 |
| 5,946,682 A * | 8/1999 | Wolfe | 707/10 |
| 5,953,392 A * | 9/1999 | Rhie et al. | 379/88.13 |
| 5,978,816 A * | 11/1999 | Sakaguchi et al. | 707/501.1 |
| 5,978,847 A | 11/1999 | Kisor et al. | 709/227 |
| 5,983,184 A * | 11/1999 | Noguchi | 345/865 |
| 5,991,781 A * | 11/1999 | Nielsen | 707/513 |
| 5,999,929 A | 12/1999 | Goodman | 707/7 |
| 6,016,494 A * | 1/2000 | Isensee et al. | 707/102 |
| 6,021,426 A | 2/2000 | Douglis et al. | 709/200 |
| 6,029,175 A * | 2/2000 | Chow et al. | 707/10 |
| 6,038,541 A * | 3/2000 | Tokuda et al. | 379/100.08 |
| 6,085,226 A * | 7/2000 | Horvitz | 709/203 |
| 6,088,707 A * | 7/2000 | Bates et al. | 707/501.1 |
| 6,115,686 A * | 9/2000 | Chung et al. | 704/260 |
| 6,178,432 B1 * | 1/2001 | Cook et al. | 345/766 |
| 6,205,427 B1 * | 3/2001 | Itoh et al. | 704/258 |
| 6,240,448 B1 * | 5/2001 | Imielinski et al. | 379/90.01 |
| 6,243,091 B1 * | 6/2001 | Berstis | 345/839 |
| 6,263,265 B1 * | 7/2001 | Fera | 246/122 R |
| 6,269,380 B1 * | 7/2001 | Terry et al. | 707/1 |
| 6,308,187 B1 * | 10/2001 | DeStefano | 707/500 |
| 6,349,132 B1 * | 2/2002 | Wesemann et al. | 379/88.01 |
| 6,366,947 B1 * | 4/2002 | Kavner | 709/203 |

* cited by examiner

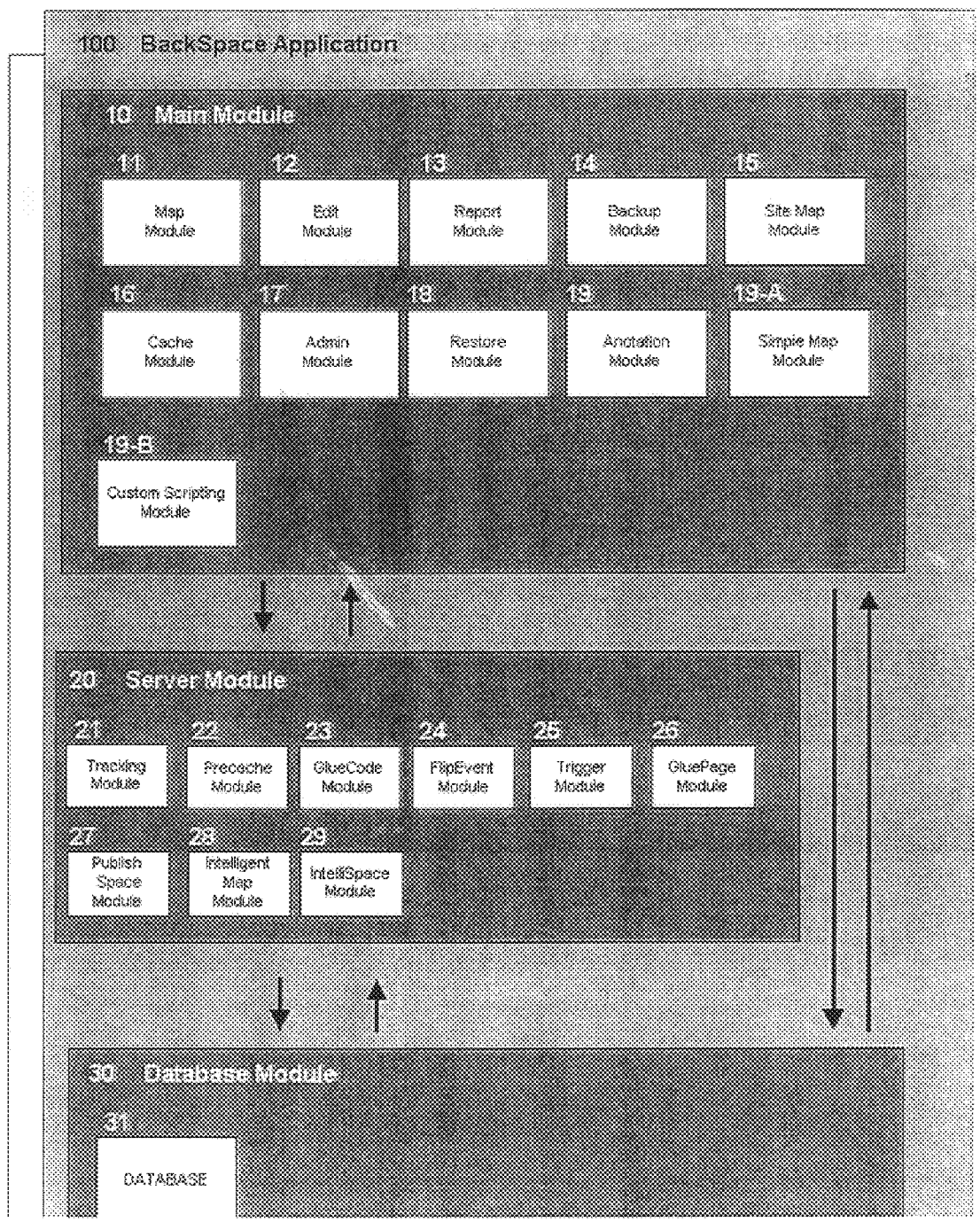

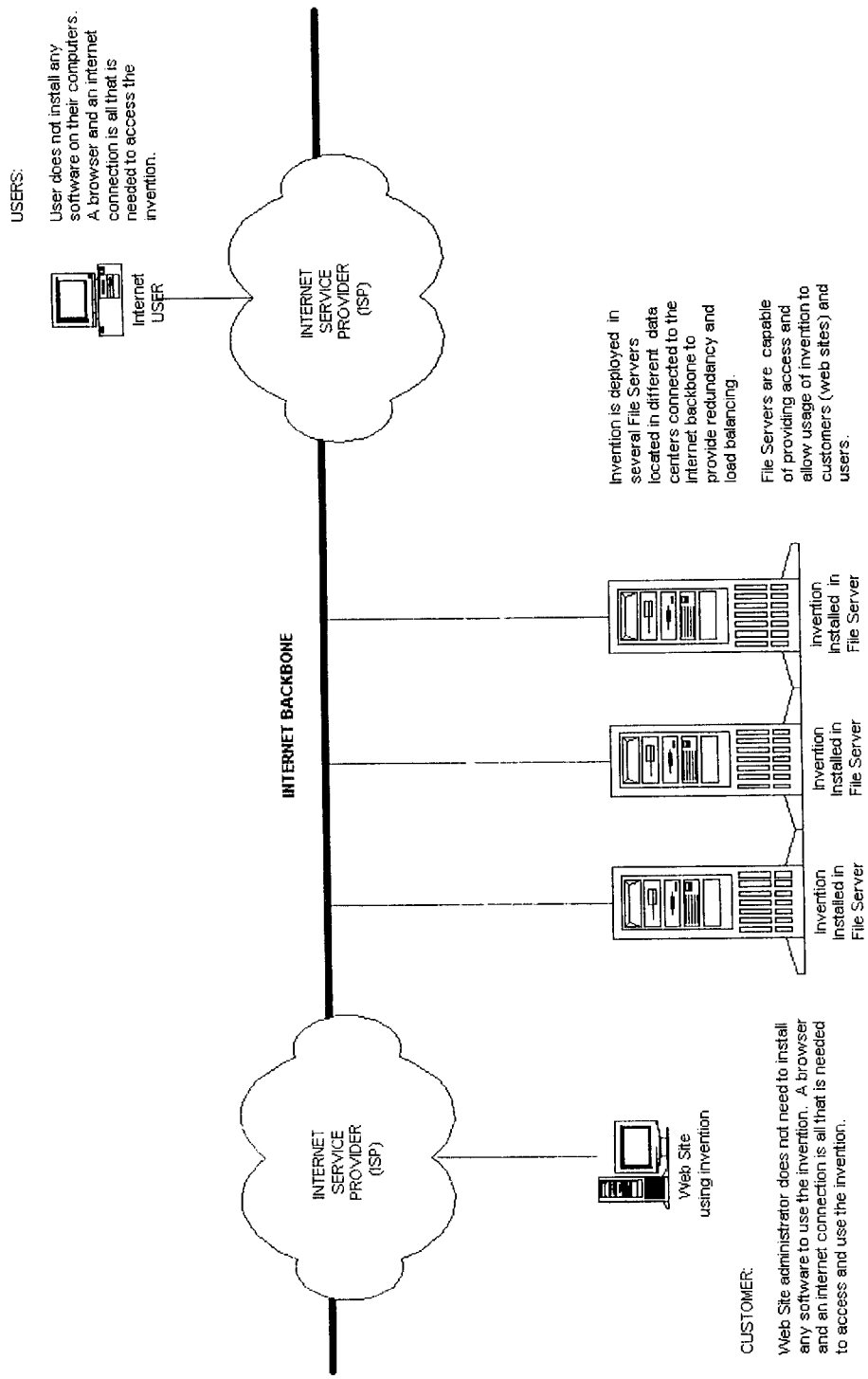

METHOD AND APPARATUS TO CREATE VIRTUAL BACK SPACE ON AN ELECTRONIC DOCUMENT PAGE, OR AN ELECTRONIC DOCUMENT ELEMENT CONTAINED THEREIN, AND TO ACCESS, MANIPULATE AND TRANSFER INFORMATION THEREON

This application is a continuation-in-part of Ser. No. 09/505,904, filed Feb. 17, 2000 abandoned.

BACKGROUND OF THE INVENTION

1. Field of the Invention

This invention relates to electronic documents, Web pages, and portions or elements of electronic documents, and more specifically to a method and apparatus for creating electronic space on the virtual flipside of Web pages or elements, referred to as "Web Back Space", and to allow additional information to reside thereon and for the Web Back Space and the information thereon to be easily accessed, managed, distributed, tracked and displayed.

2. Description of Related Art

Electronic documents are key components in the transfer of electronic information. An electronic document is a non-executable computer file containing information for use in various applications such as word processing (Word), spreadsheets (Excel) and database management systems (dBase)

Electronic documents can display digital information to computer users on the Internet, the global network connecting a multitude of users. The World Wide Web (WWW) is a system of Internet servers designed to specially support formatted documents. The most common delivery unit of an electronic formatted document is a Web page. The Internet uses Web pages to display information to the Internet users. A Web page is an electronic document located on the WWW. Documents are created on the WWW using a standard language called Hyper Text Markup Language (HTML). A specific site location on the WWW is referred to as a Web site. Each Web site contains a home page, which is the first document a user sees when first entering the site. The site may also contain different documents or pages.

A unique Uniform Resource Locator (URL) identifies each Web page. A URL is a Web address that identifies a particular Web page and its location on the WWW.

The WWW uses a standard set of procedures or protocols defining how requests are formatted and transmitted. This set of standard protocols is called Hyper Text Transfer Protocol (HTTP). HTTP is a stateless protocol since each command is executed independently, without knowledge of the commands that came before it. When a user enters a URL in his or her browser, which is a software application used to locate and display Web pages, an HTTP command is sent to the Web server directing it to fetch and transmit the requested Web page. Output, in HTML form, is sent to the user via the HTTP protocols and the user's computer receives the requested, formatted Web page. When this Web page arrives at the user's computer, the browser will normally store a local copy of the Web page in the end user's local browser. This step is known as caching.

Electronic document elements refer to any discrete item within an electronic document page such as text, graphics, data, banners, links, or any other visible entity within the electronic document page. This may include a banner, such as a strip of graphics within an electronic document having a standard size containing advertising or other information in graphical form.

Web pages and Elements are two dimensional in nature. In other words, they are flat entities composed of a standard width and height. A user sees one page at a time and can therefore only interact with the information contained within the "four corners" of the displayed page or element.

This physical restriction places a challenge to Web site architects during the initial design. Web site architects and Web page designers must carefully decide and rank information in terms of importance so that it can be placed in the best possible location throughout the Web site and in the best possible location within the Web page itself.

Even after carefully designing and building a Web site, the end result could be a Web site that is very large, extensive and complicated to navigate. Finding specific information in such a complex Web site can be a time consuming and difficult task.

Web site architects may often find themselves running out of available space on a Web page. Information, logically associated with the information contained within the Web page may have to be left out.

Adding the possibility to display information on the back space of the same Web page or electronic document element allows the Web site architect to build a more condensed and logically organized version of the same Web site, and it will also allow the user to have access to information at a faster rate than with a conventional, one-sided Web page. This increase in speed is accomplished by a technique known as precaching, which "pre-downloads" the information housed in the Web Back Space to the end user's local browser.

The Web Back Space refers to the infinite amount of "virtual hidden space" behind both the Web page and the elements displayed thereon. It refers to anything not currently seen on the front page. Once created, this "virtual real estate" may be used to store information. This technology is compatible with any media which displays electronic document pages or elements including but not limited to, Palm Pilots, WebTV (as in infomercials), and/or any future technology which displays electronic document pages, since the technology has a built-in capacity to be adapted for future technological developments.

Much like a cube which contains multiple, interconnected sides and surfaces, the multi-dimensional nature of the present invention allows the user to add information to each "side", while assuring each side maintains a relationship with each other side.

The present invention contains code that creates additional back space on an electronic document page or electronic element. This task is accomplished by providing the Web site architect with the back space code. This back space code may be cut and pasted at any point during the process in order to create the back space on any electronic document page or element within a Web site. Upon the creation of the back space, a Back Space icon is activated.

Theoretically, an infinite number of back pages may be added to an electronic document page, or Web page. The created back space may remain devoid of information for a given length of time, said information to be added at a later time, or information may be created and stored on the newly-created space immediately after the back space has been created.

Today, however, a Web page that needs such additional information must depend on linking to a separate Web page to display such information.

Accordingly, what is needed in the art is a system and method that overcomes the restriction discussed above by providing the required technology to create the back space on a Web page or Web page element and to display information on the back space, in addition to the front side of the Web page or element, where said information located on the back space may or may not be related to the information located on the front side of the Web page.

It is, therefore, to the effective resolution of the aforementioned problems and shortcomings of the prior art that the present invention is directed.

BRIEF SUMMARY OF THE INVENTION

The present invention allows users to create and use the virtual back space of an electronic document page such as a Web page on the Internet, or an electronic document element and to house and display additional content information thereon.

In particular, the present invention provides a method for publishing information on the back side of an electronic document page comprising the steps of providing a user with a list of available electronic document pages, determining if the electronic document page contains information which is to appear on a back side of the electronic document page, adding the information to the back side of the electronic document page, linking the front side of the electronic document page to a respective back side of the electronic document page, displaying the front side of a requested electronic document page, providing triggering means to allow the user to display the back side of the electronic document page, and displaying the back side of the electronic document page.

In an alternate embodiment, the present invention provides a method for creating additional space on an electronic document page or element, for storing, displaying and managing the information contained thereon comprising the steps of compiling a list of available electronic document pages wherein each page has a front side, selecting an electronic document page, creating additional back space on the selected electronic document page, adding information to the back space of the electronic document page, determining if the electronic document page contains a back space and if the back space contains information, providing a list of available electronic document pages and their respective back space information, activating the back space, paring the front side of the electronic document page to its respective back space, if necessary, separating the front side of the electronic document page from its respective back space thereby leaving the back space empty for future use and allowing for the future input of information, displaying or transferring the electronic document page and the information contained thereon to the end user or a third party and once it is received, begin to send its respective back space information and caching such information in the end user's local browser, displaying the front side of a requested electronic document page, notifying the user by audio, visual, or other means such as the displaying of a Back Space icon on the front side of the requested electronic document page after the back space information has been pre-cached in the end user's local browser, providing triggering means to allow the user to display the back space of the electronic document page via the movement or click of a mouse or to display the back space after a predetermined amount of time, or by any other automatic triggering mechanism, and displaying the back space of the electronic document page.

In still another embodiment, the present invention provides means to send the information contained on the back space of the electronic document page via e-mail to another end user, and tracks and displays the number of times the back space of an electronic document page is displayed.

In yet another embodiment, the present invention also provides a means to select a specific electronic document element or elements on an electronic document page, to create a back space or use the pre-created back space and to flag it so the back space is managed, receives information and is pre-cached the same way the back space of an electronic document page is precached. Pre-caching is commonly used in the industry to optimize data transfer by pre-downloading a local copy of data accessed over a network to a specialized local buffer storage that is continually updated.

By providing Web site architects with the additional option to create and use the back space to store and display information, a new dimension is added that allows the infinite expansion of available space in which to place information. This new dimension is one that enhances web design and organizational capabilities and improves the speed at which information is delivered via the World Wide Web.

The new dimension creates the opportunity for Web Site architects to create entirely new Web sites and Web pages or modify existing Web Sites and Web Pages to contain information on the front side of a Web page and also on the created back space.

The present invention is designed to be implemented, deployed and managed on a single file server at a data center, and accessed via the Internet by all users. This model is referred to as an Application Service Provider (ASP) model. The present invention also supports the use of multiple file servers and distributed server farms, if needed, to improve response times and load balancing.

Under an ASP model users have immediate access to the entire set of modules via the Internet without having to perform any software installation to their computers. All is needed to access and use the invention is a computer browser and access to the Internet. Through a brief registration process, users open an account that enables them to use the invention and all its modules to perform the different tasks supported by the system, all via the Internet, without having to perform any local software installation. In this way, the Web site administrator need not install any software in order to use the invention.

New design implementations are possible in which the back space of the Web page or Web page element can be used to provide background, related, non-related, support and/or additional information in addition to the information being displayed on the front side of the Web page. The back space may also be used to house information entered by the user, such as e-mail messages, which may be forwarded to a remote user.

For example, information about a health care provider and its services may be placed on a Web page while information like directions to local health care facilities and names of contacts within the facility can be placed on the back space.

The present invention has additional applications like the placement and hosting of advertising materials on the back space of an electronic document page or element. Information may be in any form, including text, graphics, GIFs, advertisements, video, audio, streaming media, digital visual information, or any combination thereof. Virtually any application which requires the posting of information on a Web page can use the present invention to "glue" additional information to the "Web Back Space" of the initial, front page or element.

Therefore, it is an object of the present invention to provide a method and apparatus to create the virtual space on the back of an electronic document page such as a Web Page, or on an electronic document page element.

It is another object of the present invention to provide a method and apparatus to allow information to be entered, stored and displayed on the back space of an electronic document page or element.

It is yet another object of the present invention to provide a means for gluing and ungluing the front page and the back space of an electronic document page or element.

It is still another object of the present invention to provide a means of activating the back space of a Web page or element in order to display it upon a user's computer screen.

Another object of the present invention is to provide a method to pre-cache the information residing on the back space and pre-download it to the user's local browser.

It is another object of the present invention to provide a means to select a specific electronic document element on an electronic document page and flag it so the back space of the electronic document element is pre-cached the same way the back space of an electronic document page is pre-cached.

Yet another object of the present invention is to provide means to send the information contained on the electronic document back space via e-mail to another end user.

It is still another object of the present invention to provide a mechanism to track the number of times the back space is displayed.

It is yet another object of the present invention to provide a report on the number of times the back space is displayed.

In accordance with these and other objects which will become apparent hereinafter, the instant invention will now be described with particular reference to the accompanying drawings.

BRIEF DESCRIPTION OF THE SEVERAL VIEWS OF THE DRAWINGS

FIG. 1 is a high-level block diagram depicting the system and methods of the present invention and illustrates the interaction between program modules.

FIG. 2 depicts the preferred embodiment of the present invention used an ASP implementation.

DETAILED DESCRIPTION OF THE INVENTION

Referring to FIG. 1, the system and method of the present invention 100 is shown.

The system described in FIG. 1 can be used to operate on any electronic document page. However, for description purposes, an Internet Web site implementation, its Web pages and its Web page elements have been used as a practical example.

The system described in FIG. 1 is composed of several distinct program modules that are linked to form the virtual back space technology of the present invention 100. Main module 10 activates all options and selections from the other program modules and provides the graphical user interface for the user.

Server Module 20 contains several modules that reside on the file server and performs all direct interfacing between the end user selections and the database. Database Module 30 houses the required database schema, stored procedures, and data generated by the other modules. In a typical implementation, the Web Site architect uses the apparatus and method of the present invention to create, edit or restructure a Web site so it contains Web pages and Web page elements that may receive, store and display information on both its front side and its respective back space.

Main Module 10 is the main interface of the entire system, coordinating all possible branching of user selections as well as distributing and validating program data between program modules. All user program options and selections are initiated by Main Module 10.

Map Module 11 performs the task of mapping an existing Web site and presenting the Web Site architect with a list of existing Web pages or elements. This module will present the Web Site architect with a list of all Web pages and elements contained in the Web site. The pages or elements contained in the Web site may or may not contain a back space. Further, the back space of the Web Page or electronic element may or may not contain information. If a Web page or electronic element listed by Map Module 11 contains a virtual back space and information thereon, the page will be displayed and flagged properly to show such additional information.

GlueCode Module 23 creates the back space of an electronic document page or an electronic document element. Upon the creation of a back space, a Web Back Space icon is activated. This task is accomplished by providing the Web Site architect with the back space code that allows the architect to create the new back space.

A web designer will login to the system with a username and password and the system will present the web designer with list of available electronic documents. The web designer selects which electronic document will have a new backspace created. After the selection is made the system updates the database and generates a string of code called GLUECODE™ that is unique to this specific Web designer, Web site and Web page. The Web designer at this point has the choice of inserting this code into the Web page in question, or have the system perform this action automatically. Once the GLUECODE™ is inserted into the Web page in question, the Web page has the capacity to display information on the newly created back space. Once the Web page is loaded into a computer browser over the Internet, the GLUECODE™ inserted in the web page points to the database and pulls the respective information the user has assigned to this specific GLUECODE™. The information is then picked up by the Precache Module 22 and sent to the computer browser immediately after the front side of said Web page finishes loading. Once the information in the back space is downloaded to the local computer browser over the Internet, the back space can be immediately displayed my means of the computer mouse.

The back space code, once acquired, may be cut and pasted at any point during the process in order to create the back space within the Web site. The code may also be used to create a back space to every electronic document page or element within the Web site at one time. The back space created is infinite in nature. Hence, an infinite number of Web Back Pages may be added to the electronic document page or electronic document element. The created back space may be used to house information or it may remain empty for future addition of information, for example, for annotation purposes or other data entered by the user.

Edit Module 12 performs the editing of the existing Web site in terms of adding information to the back space. This task is accomplished by providing a Web Site architect with an implementation matrix that allows the architect to unite or glue an electronic document back space to the front side of a Web page thereby forming one new Web page, or Web BIPAGE™, that will have a front side and an associated Web Back Space. The recursive nature of this technology allows for the adding of information to an unlimited number of Web Back Pages within the Web Back Space.

GluePage Module 26 will perform the actual construction of the new Web site based on the selections performed by the architect implementing Edit Module 12. GluePage Module 26 will read the implementation matrix constructed during the Edit Module 12 session and will pair or "glue" all the back spaces to the front side of their respective Web pages or elements. This module also unglues the back spaces from their respective front sides, leaving the back space, or a portion of the back space, empty. The back space is available to add other information; it may remain empty for future use, or it may be deleted.

The recursive nature of this technology allows for the "gluing" or combining of an unlimited number of back spaces with corresponding front spaces to form Web Back Pages. Web BackPages are electronic documents that are "attached" to either a front page of an electronic document or an element thereon such that the contents download sequentially to those of the front page giving the user faster access to the information contained on the Web BackPage. This particular implementation is analogous to a book composed of several pages having a discrete order or sequence (i.e. a WEBOOK™).

Flip Event Module 24 contains the required programming code that performs the viewing of the back space. Whenever a user loads and displays a Web page that contains additional information on the back space of the Web page or element of the Web page, the Flip Event program code will be activated and the Web Back Space icon will be displayed, informing the user of the existence of a back space in case the user decides to view the back space.

Precache Module 22 performs the pre-caching or pre-downloading of the information housed in the Web Back Space.

Cache Module 16 performs the selection and display of electronic element(s) that are going to be, or are being, precached by use of the Precache Module 22. Once an electronic document element, which is a portion of the electronic document page, has been selected as a pre-cached electronic document element, the system will transmit the information related to that electronic document element in the same way it does when transmitting the information contained in a back space of an electronic document page.

Trigger Module 25 contains the different options to trigger the viewing of the back space of a Web page or Web page element. Depending on the actual implementation of the system and methods described by this invention, the Web site architect may opt to trigger the viewing of the back space, without any user interaction. This mechanism may work in conjunction with the Flip Event Module 24 so that the user may display the back space before the trigger mechanism takes effect. The Web Back Space icon will be displayed to inform the user of the existence of a back space.

Annotation Module 19 performs the capture of the data entered by the user on a back space. This captured data can then be forwarded to a third party, along with an electronic message, or e-mail. The user can select an E-mail Icon, which is shown in the newly-created backspace. The system will prompt the user for a recipient's e-mail address. After the recipient's address is entered, an Email Module sends the information contained in the back space to the recipient's e-mail address.

Backup Module 14 performs the data backup of an existing Web site to protect the data from being overwritten and/or changed by the user during an Edit Module 12 session. This Web site data backup will be made available to the Web site architect in case he decides to undo or restore a previous version of the Web site.

Site Map Module 15 provides the Web Site architect with a list of the Web Site's electronic document pages and elements along with their respective back space information.

Restore Module 18 performs the step of restoring the data from existing backup data sets performed by the backup Module 70.

Within Main Module 10, the invention also allows provides a Simple Map Module 19A that allows the user to track where he or she has been throughout the Web site, i.e. which pages and which back pages have been contacted and viewed. A simple graphical map can be accessed, giving the user a visual representation of the order in which he or she has accessed information.

Server Module 20 also provides an Intelligent Map Module 28. This module expands upon the mere graphical representation of the user's progress of Module 19A, now adding an analysis of the user's progress through the Web site.

Publish Space Module 27 provides a mechanism for automatically displaying designated back space information on a specific date and time predetermined by the Web site Architect.

In order to track access patterns of users, the software controlling IntellSpace Module 29, automatically sorts and precaches the accessed electronic document elements in order of popularity thereby allowing the Web site Architect to rank the order in which various electronic elements will be precached.

Tracking Module 21 performs the steps of tracking how often the back space of a Web page or Web page element is displayed by a user, as well as tracking elements and words on the front side of the electronic document.

Report Module 13 performs the step of building and displaying customized reports of performance, and tracks related data useful to the Web site architect.

Admin Module 17 performs the administrative tasks required to maintain the existing system implementation.

Custom Scripting Module 19B provides a mechanism to coordinate the scheduling of a specific advertisement or advertising campaign for a selected set of Web sites. The advertiser can identify all the Web sites in which to run the advertisement or ad campaign send the advertisement to all sites at once and manage the scheduling of the advertising campaign.

FIG. 2 shows the preferred implementation of the present invention. This model, known as the Application Service Provider (ASP) Model, allows the current invention, once deployed in one or more file servers at a data center, to be used by any Internet user, without having to install any additional software on their local computer.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A tool for developing a website for a website manager or designer to permit the website designer or manager to rapidly create or modify an existing website by adding one or more web pages to a first web page for initial transmission in response to a user's request in accessing a website comprising:

means for providing a list of web pages on a website for said designer;

means for selecting by said website designer a first website page;

means for automatically generating HTML coupling code (glue code) to couple the previously selected first web page to a second web page for transmission to the user's computer, said coupling code (glue code) including a means for pre-caching said second web page attached to said first web page during the initial transmission of said first web page to said user's computer;

means for modifying an existing data base to create a reference between the automatically generated HTML coupling code (glue code) above, the website, the website designer and the first web page previously selected by the web designer; and means for electronically uploading to the website, one or more web pages that can be later coupled with the available first web pages.

2. A tool as in claim 1, wherein:

said tool is embodied in a software program for use by a website designer.

* * * * *